No. 747,102. PATENTED DEC. 15, 1903.
B. P. VANCE, C. F. JONES & R. CHAMBERLAIN.
DRAG FOR SALVING SUNKEN VESSELS.
APPLICATION FILED APR. 14, 1903
NO MODEL.
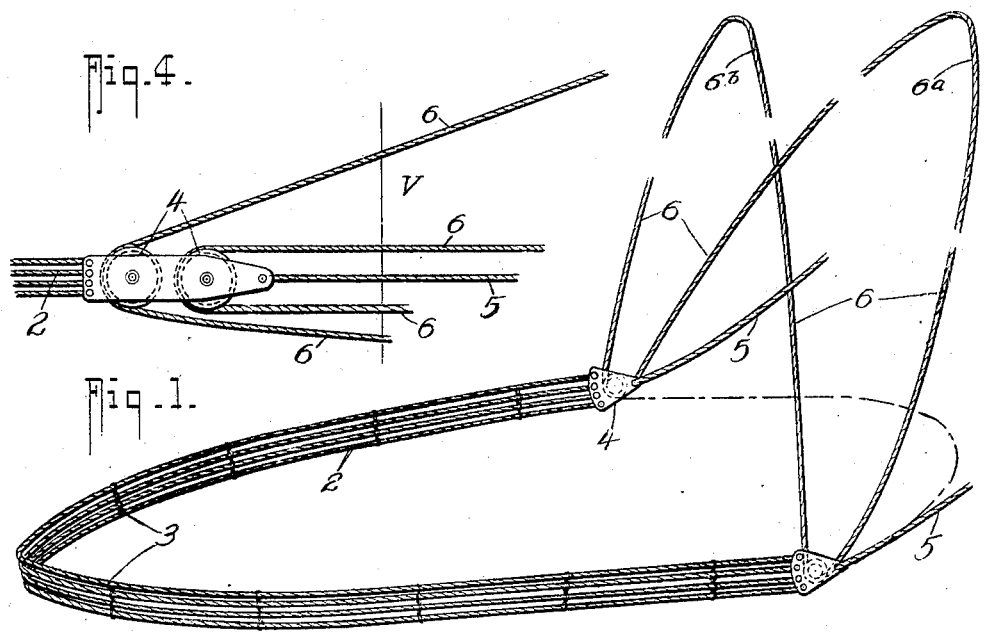
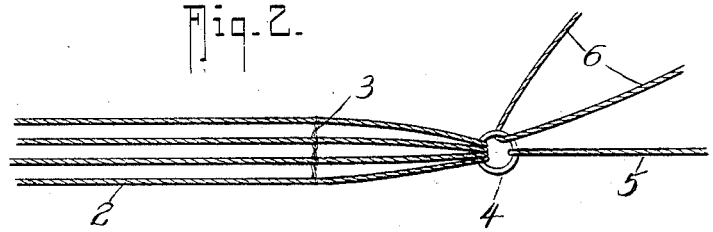
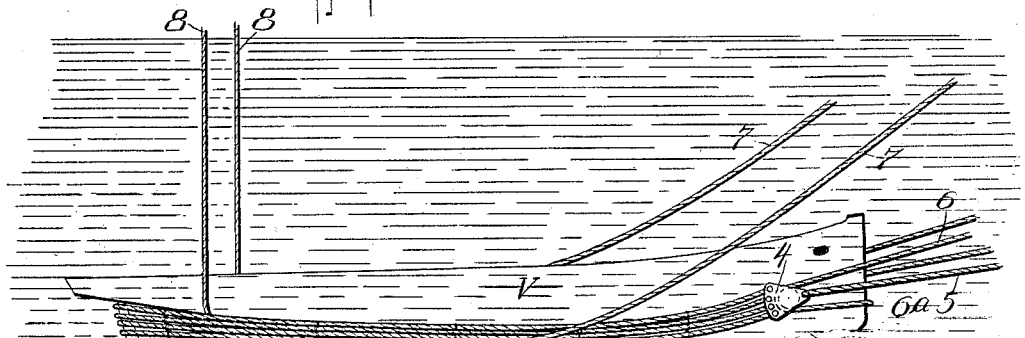
WITNESSES:
F. C. Gibson
John T. Schrott
INVENTORS
Bayne Patrick Vance,
Charles Francis Jones,
and Robert Chamberlain
BY Fred G. Dieterich
ATTORNEY No. 747,102.

Patented December 15, 1903.

UNITED STATES PATENT OFFICE.

BAYNE P. VANCE, CHARLES F. JONES, AND ROBERT CHAMBERLAIN, OF VANCOUVER, CANADA.

DRAG FOR SALVING SUNKEN VESSELS.

SPECIFICATION forming part of Letters Patent No. 747,102, dated December 15, 1903.

Application filed April 14, 1903. Serial No. 152,579. (No model.)

*To all whom it may concern:*

Be it known that we, BAYNE PATRICK VANCE, CHARLES FRANCIS JONES, and ROBERT CHAMBERLAIN, citizens of the Dominion of Canada, residing at the city of Vancouver, in the Province of British Columbia, Canada, have invented a new and useful Improvement in Drags for Salving Sunken Vessels, of which the following is a specification.

Our invention relates to an improved means for salving vessels which have sunk in deep water; and our object has been to provide means by which such may be dragged into shoal water, which may be operated from boats or scows without the necessity of divers.

After the position of the wreck has been determined and the depth of water in which it lies ascertained we propose to lower to the bottom a specially-designed drag controlled from boats or scows and to tow such along the bottom until it engages the stern of the sunken vessel. We then by virtue of the special construction of the tackle are enabled to secure the drag round the vessel's bow and by stout hauling-gear pull the vessel into shoal water, means being also taken to sustain as much as possible of the weight from scows on the surface. The drag by means of which we propose to accomplish this result and the method of its application to a sunken vessel are fully described in the following specification and illustrated in the drawings which accompany it, in which—

Figure 1 shows the simple elements of the drag. Fig. 2 is an enlarged detail of an alternative drag-eye, showing the attachment of the ropes thereto. Fig. 3 shows the application of the drag to a sunken vessel, and Fig. 4 shows the application of a double stem-clasp.

The drag consists, essentially, of a series of wire ropes 2, (the number being regulated to the size and weight of the vessel,) flexibly braced together in practically parallel lines by the cross-ties 3. The drag-ropes 2 are connected to a strong sheave or ring 4 at each end, to the farther end of which a stout wire tow-rope 5 is secured. These constitute the simple elements of the drag, but as a means to secure the drag on the hull of a vessel we provide an endless wire rope 6, which being passed through the sheave or ring 4 in the manner shown in Fig. 1 forms two bights or loops $6^a$ $6^b$. If one of these loops $6^a$ is dropped, as indicated by dot-and-dash lines in Fig. 1, and the other loop drawn in, the ends of the drag-ropes 2 will be drawn together, and the manner of its action will be more fully understood as we describe the operation of the drag to secure a sunken vessel.

The position of the vessel V being determined and the depth of water ascertained, the drag is lowered to the bottom, both loops $6^a$ $6^b$ being retained on the surface on scows or boats, and the drag is drawn toward the location of the vessel by means of a tug or boat on each of the tow-ropes 5, preferably in such a manner that the drag will engage the hull under the stern, as shown in Fig. 3. As soon as the hull is encountered the bight or loop $6^a$ of the endless rope 6 is dropped and the loop $6^b$ is drawn in until the loop $6^a$ engages the stem of the vessel, as indicated. $6^b$ is then carried forward, preferably to the shore, if such is within reach, and, with the tow-ropes 5, forms the principal means of dragging the vessel into shoal water. The flexible construction of the drag 2 will enable it to conform to the swell of the vessel's bilge, under which it will be drawn by the forward hauling effort of the loop $6^b$ and the tow-ropes 5 and will thus cause a certain lifting tendency of the hull when a hauling effort is exerted to drag the vessel into shoal water. If necessary, this lifting tendency may be assisted by auxiliary towing-ropes 7, spliced into the ropes 2 of the drag, and lifting-ropes 8 may be furnished in such number as may be required and secured to boats or scows, by which a considerable portion of the weight of the vessel may be sustained from the surface of the water, thus lessening the hauling effort necessary to drag the vessel from its bed.

For ordinary cases the single end sheave and stem-clasp loop, as illustrated in Figs. 1 and 3, may prove sufficient; but if the weight of the vessel to be salved be considerable the number of end clasping-ropes 6 may be increased to suit the requirements of the case, and a separate sheave for each may be provided.

Fig. 4 shows two endless ropes 6 applied through two sheaves 4, arranged tandem-wise, and if with such an arrangement the uppermost loop on the stem be used for a ground haul the lower one may be safely used for a lifting pull by taking the rope from it over a lead on scows on the surface, which scows may be tied to the stern of the vessel V, as in such a case the dead haul on the upper one will prevent the lower one being pulled over the stem by the lifting effort. For light vessels a simple ring, as illustrated in Fig. 2, will serve the requirements of the case.

From the foregoing description it will be clear that the tackle can be drawn into engagement with and secured to a sunken vessel without any necessity for the employment of divers, and therefore the device is especially applicable for the salving of vessels sunk in water too deep for such to work.

Where auxiliary lifting-ropes 8 are used, they may be secured to boats on the surface and while the drag is being pulled into position will serve to guide its direction.

Although we claim the construction of the drag in a series of flexibly-connected ropes 2, the essential element of our device lies in the means by which we draw the two ends of the drag together and secure them round the stem of a vessel, and we do not desire to be limited to the endless rope 6 as a means for doing this, though we believe it will prove the most efficient; but the tow-ropes 5 may be respectively passed through the sheave or ring of the opposite drag end and thereafter carried forward.

Having now particularly described our invention and the manner of its application to the work it is designed for, what we claim as new, and desire to be protected in by Letters Patent, is—

1. As a means for salving sunken vessels, a drag portion composed of a series of wire ropes flexibly connected in substantially parallel lines; sheaves or rings secured to the ends of such drag portion; a tow-rope secured to the frame of each sheave or ring; and an endless wire rope or ropes passed through such sheaves or rings in such a manner that two bights or loops thereof are formed in each, substantially as described.

2. As a means for salving sunken vessels, a drag composed of a series of ropes 2 connected in substantially parallel lines; sheaves or rings 4 secured to the ends of such; the tow-ropes 5; the endless rope or ropes 6 passed through the sheaves or rings; two or more auxiliary tow-ropes 7; and two or more auxiliary lifting-ropes 8, substantially as and for the purpose specified.

In testimony whereof we have signed our names to this specification in the presence of two subscribing witnesses.

BAYNE P. VANCE.
CHARLES F. JONES.
ROBERT CHAMBERLAIN.

Witnesses:
ROWLAND BRITTAIN,
R. B. WARD.